Aug. 4, 1931.  C. DOLLACK  1,817,131

POISE

Filed Oct. 9, 1928

INVENTOR.
Charles Dollack
BY Duell, Dunn & Anderson
ATTORNEYS.

Patented Aug. 4, 1931

1,817,131

UNITED STATES PATENT OFFICE

CHARLES DOLLACK, OF BROOKLYN, NEW YORK, ASSIGNOR TO THE JACOBS BROS. CO., INC., OF BROOKLYN, NEW YORK, A CORPORATION OF NEW YORK

POISE

Application filed October 9, 1928. Serial No. 311,330.

This invention relates to a functionally and structurally improved poise structure capable of use in numerous different associations, but primarily to be employed in connection with scales of the even-balance type.

It is an object of the invention to provide a device of this character, the parts of which will be few in number and rugged and simple in construction and capable of assembly by relatively unskilled labor, to furnish an inexpensive article of this nature operating over long periods of time with freedom from mechanical difficulty.

A further object of the invention is that of furnishing a device of this character which will be locked against accidental shifting in an improved manner and in which such locking may be simply achieved, aside from the fact that the poise will operate freely under normal conditions.

With these and further objects in mind reference is had to the attached sheets of drawings illustrating practical embodiments of the invention and in which:—

Figure 1:
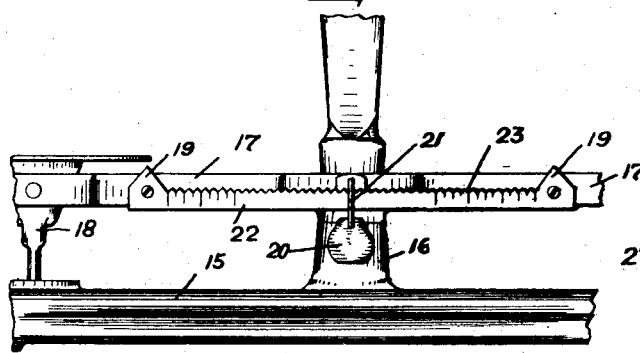
Figure 1 is a fragmentary front elevation of a scale with which there is associated a poise and bar embodying the present invention.

In Figure 1 there has been generally illustrated a scale and in this view the numeral 15 indicates the scale base, from which a support 16 extends upwardly, this support mounting suitable bearings carrying a beam 17 at the outer ends of which pans and their supporting structure 18 is provided. It is usual, in a scale of this nature, whether it be of the simple, even-balance type or whether it be of the "over- and underweight" type, to provide a bar mounting a poise which, when shifted, serves to provide a counter-balance, the value of which is registered by graduations appearing upon the face of the bar. Thus, a rack bar 19 has been shown as attached to the beam 17 and mounts a poise weight 20 by means of a suspension member or "Chill" 21. It is to be observed that the face of the bar has scale marks or sub-divisions 22, the value of which may be suitably indicated and that the upper edge of this bar is serrated to provide a series of teeth 23 between which the suspension member 21 may rest. Furthermore, this bar may be inclined to vertical so that its sub-divisions can be read with facility and, as will be noted in Figure 2, the bearing portion of the suspension member may have a knife edge, the converging faces of which extend at an angle to each other more acute than to the side faces of the teeth 23. As a consequence it will be appreciated that the "chill" or suspension member will have a free swinging movement during the oscillation of the beam and that the poise weight will always remain vertical below its point of suspension.

Figure 4:
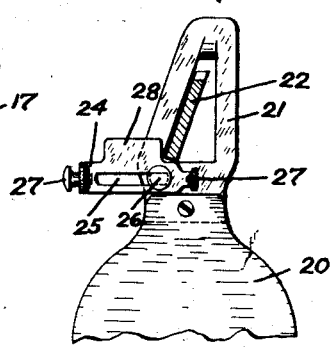
Figs. 3 and 4 are sectional views taken through the bar and showing the poise in locked and unlocked conditions respectively thereon.
Figure 2:
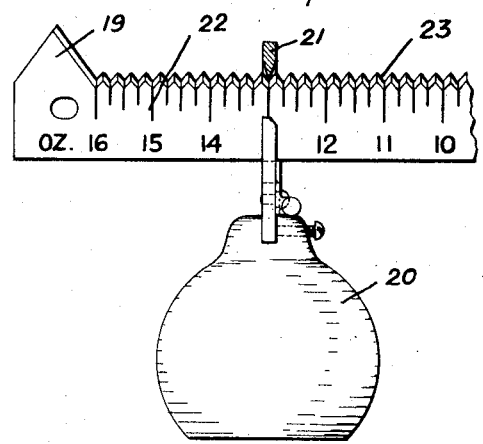
Fig. 2 is a fragmentary enlarged view of the poise and rack bar.
Figure 3:
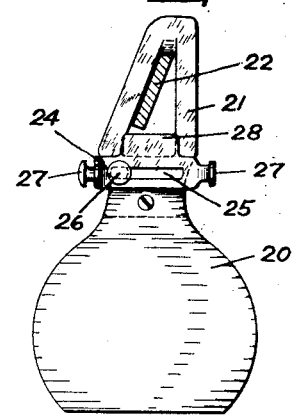

Now, with a view to providing means which will prevent a jumping of the suspension member from a point between two teeth of the bar, a number of desirable constructions may be employed as, for example, in Figs. 2 to 4, the opening in the loop providing the suspension member is triangular in shape, with its outer edge inclined—to allow for the inclination of the rack bar—and immediately below the opening there is mounted a slide member 24, by forming this member with a slot 25 through which a headed pin 26 extends. Portions 27 against which the fingers of an operator may bear are furnished at each end of the slide and this element carries an abutment or extension 28 which, when in the position shown in Fig. 3, will serve to restrict the effective space defined by the loop member to such an extent that the bearing edge of the latter cannot be lifted sufficiently clear of the bar to move the poise along the same. However, by simply shifting the slide from the position shown in Fig. 4, space adequate to this end is provided.

Figure 5:
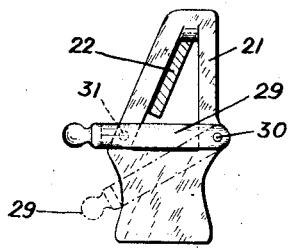
Fig. 5 is a view similar to Fig. 3, but showing a slightly different form of locking mechanism.
Figure 6:
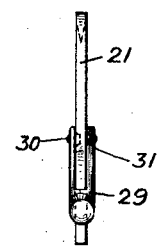
Fig. 6 is an edge view of the mechanism as shown in Fig. 5.

In the form of construction shown in Figs. 5 and 6, a lever 29 is provided as a substitute for the construction shown in the preceding figures. This lever has its inner end pivotally mounted as at 30 and may have a detent portion 31 for cooperation with a recess to normally retain it in the position shown in full lines. In this position a jumping or accidental shifting of the poise is prevented, but by simply swinging the lever downwardly to the position shown in dotted lines in Fig. 5, a free movement of the parts is assured.

Figure 7:
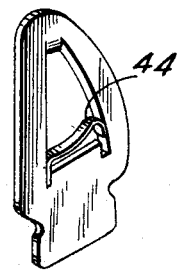
Fig. 7 shows still a different form of supporting element for use in connection with the poise.

Finally, with respect to Fig. 7, a construction has been shown in which, by means of a spring element 44 bearing against the lower edge of the rack member, not shown in brackets, an accidental shifting of the parts is prevented; while, if the poise and suspension member are lifted, the rack member will bear against the spring to permit sufficient clearance to be established to allow of such shifting.

From the foregoing it will be appreciated that, among others, the several objects specifically aforementioned are achieved. It is intended, however, that numerous changes in construction and rearrangement of parts might be resorted to without departing from the spirit of the invention as defined by the claims.

Having described my invention, what I claim as new and desire to secure by Letters Patent, is:—

1. A device of the character described including, in combination, a rack bar, a poise-supporting member having an opening to accommodate said rack bar and suspended therefrom and means movably mounted by said supporting member and shiftable to restrict the effective area of said opening to limit the movement of said supporting member and poise with respect to said rack bar.

2. A device of the character described including, in combination, a rack bar, a poise-supporting member having an opening to accommodate said rack bar and suspended therefrom and means associated with said supporting member and extendable into the opening thereof to a point adjacent said rack bar, whereby to restrict the effective area of said opening and limit the movement of said supporting member with respect to said bar.

3. A device of the character described including, in combination, a rack bar having a serrated upper edge, a supporting member formed with an opening for the accommodation of said bar and the upper edge of said opening cooperating with the serrated portion of said bar, and means movably carried by said supporting member and extending adjacent the lower portion of the opening thereof and the lower edge of said bar, said means being spaced from said bar a depth less than the depth of the serrated portions and being shiftable to permit of said supporting member being moved to clear the serrations of said bar.

4. In combination a rack bar formed with a serrated upper edge, a supporting member formed with an opening for the accommodation of said bar and means movably carried by said supporting member and shiftable across said opening at a point immediately adjacent the lower edge of said bar to prevent accidental movement of the supporting member with respect to the bar.

5. In combination a rack bar formed with a serrated upper edge, a supporting member formed with an opening for the accommodation of said bar and a locking element movably carried by said supporting member and shiftable with respect thereto to extend into a position restricting the area of such opening and extending adjacent the lower edge of said bar.

6. In combination a rack bar, a supporting member formed with an opening for the accommodation of said bar and a locking element formed with an abutment, said element being shiftably mounted by said member to have its abutment extend across said opening and adjacent the lower edge of said bar.

In testimony whereof I affix my signature.

CHARLES DOLLACK.